(12) United States Patent
Takimoto

(10) Patent No.: US 10,474,139 B2
(45) Date of Patent: Nov. 12, 2019

(54) SUBSTRATE PROCESSING APPARATUS AND SUBSTRATE PROCESSING METHOD

(71) Applicant: Tokyo Electron Limited, Tokyo (JP)

(72) Inventor: Yuuji Takimoto, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 245 days.

(21) Appl. No.: 14/824,720

(22) Filed: Aug. 12, 2015

(65) Prior Publication Data
US 2016/0054719 A1 Feb. 25, 2016

(30) Foreign Application Priority Data
Aug. 19, 2014 (JP) ................. 2014-166641

(51) Int. Cl.
*G05B 19/418* (2006.01)

(52) U.S. Cl.
CPC .......... *G05B 19/41875* (2013.01); *G05B 2219/24015* (2013.01); *Y02P 90/22* (2015.11)

(58) Field of Classification Search
CPC ........ G05B 19/402; G05B 2219/24015; G05B 19/404; G05B 2219/40164; G05B 2219/45031; G05B 19/41875; G05B 19/4184; Y02P 90/22; H01L 22/20
USPC ................................. 700/117–121
See application file for complete search history.

(56) References Cited

U.S. PATENT DOCUMENTS

| | | | | |
|---|---|---|---|---|
| 6,197,123 B1* | 3/2001 | Poag | ............... | C23C 16/4405 134/18 |
| 2006/0281199 A1* | 12/2006 | Matsushita | ........... | H01L 22/20 438/14 |
| 2008/0140225 A1* | 6/2008 | Shneyder | ........... | G05B 23/0275 700/30 |
| 2010/0154826 A1* | 6/2010 | Printz | ............... | H01L 21/67028 134/18 |
| 2010/0162029 A1* | 6/2010 | Powell | ............. | G06F 11/07 714/2 |
| 2012/0130525 A1* | 5/2012 | Tsai | ................ | G05B 19/41875 700/108 |
| 2014/0031968 A1* | 1/2014 | Baseman | ............. | G05B 13/048 700/121 |

(Continued)

FOREIGN PATENT DOCUMENTS

| | | |
|---|---|---|
| CN | 102760644 A | 10/2012 |
| JP | 05-251328 A | 9/1993 |

(Continued)

*Primary Examiner* — Robert E Fennema
*Assistant Examiner* — Shon G Foley
(74) *Attorney, Agent, or Firm* — Abelman, Frayne & Schwab

(57) ABSTRACT

Disclosed is substrate processing apparatus including a plurality of processing units, each of which processes a substrate, and a controller that causes each of the processing units to execute a substrate processing. The controller is configured to cause a processing unit with a detected abnormality to execute an improvement processing based on abnormality detection information including a content of abnormality detected by a substrate surface measurement after causing the substrate processing to be performed in each of the processing units. The improvement processing is specified from improvement processing information in which the content of abnormality and the improvement processing are correlated with each other.

16 Claims, 9 Drawing Sheets

| Abnormality Content | | Improvement Processing |
|---|---|---|
| Kind | Level | |
| Particle Generation | Lv1 | Chuck Cleaning |
| | Lv2 | Chuck Cleaning + Nozzle Cleaning |
| | Lv3 | Chuck Cleaning + Nozzle Cleaning + Cup Cleaning |
| | Lv4 | Chuck Cleaning + Nozzle Cleaning + Cup Cleaning + Chuck Cleaning |
| | ⋮ | ⋮ |
| Etching Defect | Lv1 | Dummy Dispense(Lv1) |
| | Lv2 | Dummy Dispense(Lv2) |
| | ⋮ | ⋮ |

(56) References Cited

U.S. PATENT DOCUMENTS

2014/0207271 A1\* 7/2014 Tsai .................. G05B 23/024
  700/121
2014/0379113 A1\* 12/2014 Yamamoto ....... G05B 19/41865
  700/110

FOREIGN PATENT DOCUMENTS

| JP | 06-029178 A | 2/1994 |
| JP | 11-102884 A | 4/1999 |
| JP | 11-204390 A | 7/1999 |
| JP | 2003-059887 A | 2/2003 |
| JP | 2005-064214 A | 3/2005 |
| JP | 2005-230807 A | 9/2005 |
| JP | 2006-041255 A | 2/2006 |
| JP | 2013-207186 A | 10/2013 |
| TW | 201032270 A | 9/2010 |

\* cited by examiner

*FIG.6*

| Abnormality Content | | Improvement Processing |
|---|---|---|
| Kind | Level | |
| Particle Generation | Lv1 | Chuck Cleaning |
| | Lv2 | Chuck Cleaning + Nozzle Cleaning |
| | Lv3 | Chuck Cleaning + Nozzle Cleaning + Cup Cleaning |
| | Lv4 | Chuck Cleaning + Nozzle Cleaning + Cup Cleaning + Chuck Cleaning |
| | ⋮ | ⋮ |
| Etching Defect | Lv1 | Dummy Dispense(Lv1) |
| | Lv2 | Dummy Dispense(Lv2) |
| | ⋮ | ⋮ |

191

SUBSTRATE PROCESSING APPARATUS AND SUBSTRATE PROCESSING METHOD

CROSS-REFERENCE TO RELATED APPLICATIONS

This application is based on and claims priority from Japanese Patent Application No. 2014-166641, filed on Aug. 19, 2014, with the Japan Patent Office, the disclosure of which is incorporated herein in its entirety by reference.

TECHNICAL FIELD

Exemplary embodiments disclosed herein relate to a substrate processing apparatus and a substrate processing method.

BACKGROUND

Conventionally, in a substrate processing apparatus provided with a plurality of processing units that process a substrate such as, for example, a semiconductor wafer or a glass substrate, an operation situation of each processing unit is periodically inspected.

For example, Japanese Patent Laid-Open Publication No. 2005-064214 discloses a technique for determining whether there is no abnormality in an operation situation of each processing unit by monitoring, for example, a flow rate or a temperature of an etching liquid. In the technique disclosed in the Japanese Patent Laid-Open Publication No. 2005-064214, when an abnormality is detected in the operation situation of a processing unit, a database is retrieved so as to specify an operator on duty, and the specified operator is notified of information including, for example, the content of abnormality via e-mail.

SUMMARY

A substrate processing apparatus according to an exemplary embodiment includes: a plurality of processing units, each of which processes a substrate; and a controller that causes each of the processing units to execute a substrate processing. The controller is configured to cause a processing unit with a detected abnormality to execute an improvement processing, based on abnormality detection information including a content of abnormality detected by a substrate surface measurement after causing the substrate processing to be performed in each of the processing units, and the improvement processing is specified from improvement processing information in which the content of abnormality and the improvement processing are correlated with each other.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 is a view illustrating exemplary improvement processing information.

DETAILED DESCRIPTION

Figure 1:
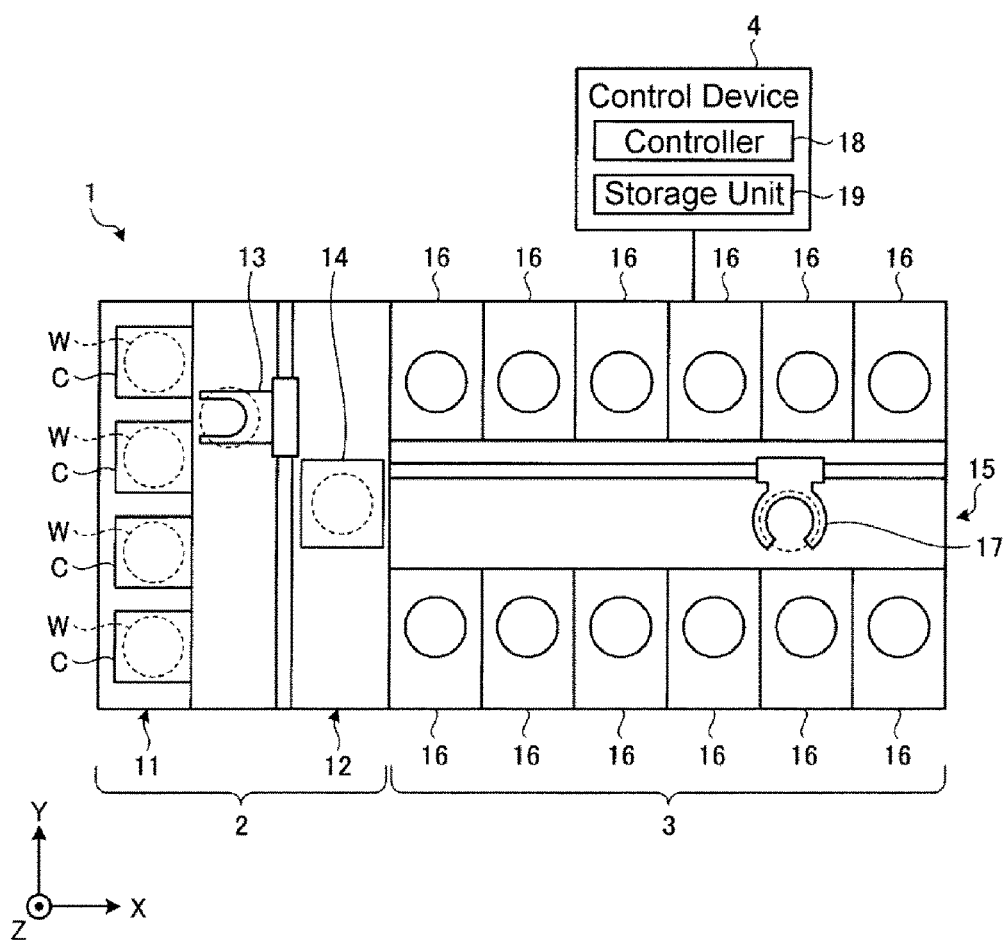
FIG. 1 is a view illustrating a schematic configuration of a substrate processing system according to an exemplary embodiment.

In the following detailed description, reference is made to the accompanying drawings, which form a part hereof. The illustrative embodiments described in the detailed description, drawing, and claims are not meant to be limiting. Other embodiments may be utilized, and other changes may be made without departing from the spirit or scope of the subject matter presented here.

In the above-described conventional technique, when it takes time until an operator performing an improvement operation arrives at the scene of operation, a delay occurs in the improvement operation, and the restoration of the processing unit is retarded by the delayed time of the improvement operation, during which the processing unit may not be used so that the operation rate of the substrate processing apparatus may be deteriorated.

In particular, unmanned factories have been increased in recent years and thus, the time taken until an operator arrives at the scene of operation has been increased. For this reason, how to suppress a restoration delay of a processing unit due to the absence of the operator has become one of problems to be solved.

In the substrate processing apparatus, as an inspection method other than the inspection method disclosed in Japanese Patent Laid-Open Publication No. 2005-064214, an operation situation of the processing unit may be performed by carrying a monitor wafer for inspection into a processing unit so that a series of substrate processings are executed thereon, and then examining a surface of the processed monitor wafer using an external measuring instrument. The above-described problems may also occur in the case of performing this inspection.

An aspect of the present disclosure is to provide a substrate processing apparatus and a substrate processing method that are capable of suppressing deterioration in operation rate in a case where an abnormality is detected in a processing unit.

A substrate processing apparatus according to an exemplary embodiment includes: a plurality of processing units, each of which processes a substrate; and a controller that causes each of the processing units to execute a substrate processing. The controller is configured to cause a processing unit with a detected abnormality to execute an improvement processing, based on abnormality detection information including a content of abnormality detected by a substrate surface measurement after causing the substrate processing to be performed in each of the processing units, and the improvement processing is specified from improvement processing information in which the content of abnormality and the improvement processing are correlated with each other.

In the substrate processing apparatus described above, the improvement processing information includes information indicating abnormality levels in each kind of abnormality as the content of abnormality, and an improvement processing to be executed is correlated with each abnormality level in each kind.

The substrate processing apparatus disclosed above further includes a storage unit configured to store the improvement processing information. The controller is configured to acquire the abnormality detection information including the content of abnormality via a network, and correlate the acquired abnormality detection information with the improvement processing information stored in the storage unit so that the improvement processing is specified.

The substrate processing apparatus further includes a storage unit configured to store the improvement processing information. The controller is configured to: acquire the abnormality detection information including the content of abnormality via a network; determine, based on the content of abnormality, whether the processing unit with a detected abnormality can be used or not; and correlate, upon determining that the processing unit cannot be used, the acquired content of abnormality with the improvement processing information so that the improvement processing is specified.

In the substrate processing apparatus described above, the controller is configured to: acquire the improvement processing information via a network; and cause the processing unit with a detected abnormality to execute the improvement processing.

In the substrate processing apparatus described above, the controller is configured to: cause the processing unit with a detected abnormality to execute the improvement processing; and cause the processing unit with a detected abnormality to execute the substrate processing again after executing the improvement processing.

In the substrate processing apparatus described above, the controller is configured to: shift the processing unit with a detected abnormality to a monitor mode to prevent the processing unit with a detected abnormality from executing the substrate processing on a product substrate; cause the processing unit with a detected abnormality to execute the improvement processing; and then, release the monitor mode of the processing unit.

In the substrate processing apparatus described above, the controller is configured to: shift the processing unit with a detected abnormality to a monitor mode to prevent the processing unit with a detected abnormality from executing the substrate processing on a product substrate is prevented; cause the processing unit with a detected abnormality to execute the improvement processing; cause the processing unit the processing unit with a detected abnormality to execute the one or more of improvement processings again after executing the improvement processing; and release, upon determining that the processing unit with a detected abnormality can be used, the monitor mode of the processing unit with a detected abnormality.

The substrate processing apparatus described above further includes a measuring instrument configured to perform the surface measurement.

In the substrate processing apparatus described above, each of the processing units includes: a substrate holding mechanism configured to hold and rotate the substrate; and a nozzle configured to eject a pre-set processing liquid. The controller is configured to cause the processing unit with a detected abnormality to execute, as the improvement processing, a processing of cleaning the substrate holding mechanism by ejecting a cleaning liquid toward the substrate holding mechanism from the nozzle in a case where the content of abnormality is generation of particles.

In the substrate processing apparatus described above, each of the processing units includes: a substrate holding mechanism configured to hold and rotate the substrate; a nozzle configured to eject a pre-set processing liquid; and a nozzle cleaning unit configured to clean the nozzle. The controller is configured to cause the processing unit with a detected abnormality to execute, as the improvement processing, a processing of cleaning the nozzle using the nozzle cleaning unit in a case where the content of abnormality is generation of particles.

In the substrate processing apparatus described above, each of the processing units includes: a substrate holding mechanism configured to hold and rotate the substrate; a nozzle configured to eject a pre-set processing liquid; and a recovery cup configured to enclose a periphery of the substrate held on the substrate holding mechanism to recover the processing liquid scattered from the substrate. The controller is configured to cause the processing unit with a detected abnormality to execute, as the improvement processing, a processing of cleaning the recovery cup by ejecting a cleaning liquid toward the recovery cup from the nozzle in a case where the content of the abnormality is generation of particles.

The substrate processing apparatus described above, each of the processing units includes: a substrate holding mechanism configured to hold and rotate the substrate; a nozzle configured to eject a pre-set processing liquid; and a chamber configured to accommodate the substrate holding mechanism and the nozzle. The controller is configured to cause the processing unit with a detected abnormality to execute, as the improvement processing, a processing of cleaning an inner wall of the chamber by ejecting a cleaning liquid toward the inner wall of the chamber from the nozzle in a case where the content of abnormality is generation of particles.

The substrate processing apparatus described above, each of the processing units includes: a substrate holding mechanism configured to hold and rotate the substrate; a nozzle configured to eject an etching liquid; and a dummy dispensing unit configured to receive and discharge the etching liquid ejected from the nozzle. The controller is configured to cause the dummy dispensing unit with a detected abnormality to execute, as the improvement processing, a dummy dispensing processing of ejecting the etching liquid to the dummy dispensing unit from the nozzle in a case where the content of abnormality is an etching defect.

A substrate processing method according to another aspect of the present disclosure includes: performing a substrate processing in a plurality of processing units, each configured to process a substrate; and performing an improvement processing based on abnormality detection information including a content of abnormality detected by a substrate surface measurement performed after the performing the substrate processing. The improvement processing is executed with respect to a processing unit with a detected abnormality, and the improvement processing is specified from improvement processing information in which the content of abnormality and the improvement processing are correlated with each other.

According to an aspect of the present disclosure, it is possible to suppress deterioration in throughput in a case where an abnormality is detected in a processing unit.

Hereinafter, exemplary embodiments of a substrate processing apparatus and a substrate processing method disclosed herein will be described in detail with reference to the accompanying drawings. However, the present disclosure is not limited by the exemplary embodiments described below.

First Exemplary Embodiment

<1. Schematic Configuration of Substrate Processing System>

FIG. 1 is a plan view illustrating an outline of a substrate processing system provided with a processing unit according to an exemplary embodiment of the present disclosure. In the following, in order to clarify positional relationships, the X-axis, Y-axis and Z-axis which are orthogonal to each other will be defined. The positive Z-axis direction will be regarded as a vertically upward direction.

As illustrated in FIG. 1, a substrate processing system 1 includes a carry-in/out station 2 and a processing station 3. The carry-in/out station 2 and a processing station 3 are provided adjacent to each other.

The carry-in/out station 2 is provided with a carrier placing section 11 and a transfer section 12. In the carrier placing section 11, a plurality of carriers C is placed to accommodate a plurality of substrates (semiconductor wafers in the present exemplary embodiment) (hereinafter, referred to as "wafers W") horizontally.

The transfer section 12 is provided adjacent to the carrier placing section 11, and provided with a substrate transfer device 13 and a delivery unit 14. The substrate transfer device 13 is provided with a wafer holding mechanism configured to hold the wafer W. Further, the substrate transfer device 13 is movable horizontally and vertically and pivotable around a vertical axis, and transfers the wafers W between the carriers C and the delivery unit 14 by using the wafer holding mechanism.

The processing station 3 is provided adjacent to the transfer section 12. The processing station 3 is provided with a transfer section 15 and a plurality of processing units 16. The plurality of processing units 16 is arranged at both sides of the transfer section 15.

The transfer section 15 is provided with a substrate transfer device 17 therein. The substrate transfer device 17 is provided with a wafer holding mechanism configured to hold the wafer W. Further, the substrate transfer device 17 is movable horizontally and vertically and pivotable around a vertical axis. The substrate transfer device 17 transfers the wafers W between the delivery unit 14 and the processing units 16 by using the wafer holding mechanism.

The processing units 16 perform a predetermined substrate processing on the wafers W transferred by the substrate transfer device 17.

Further, the liquid processing system 1 is provided with a control device 4. The control device 4 is, for example, a computer, and includes a controller 18 and a storage unit 19. The storage unit 19 stores a program that controls various processings performed in the liquid processing system 1. The controller 18 controls the operations of the liquid processing system 1 by reading and executing the program stored in the storage unit 19.

Further, the program may be recorded in a computer-readable recording medium, and installed from the recording medium to the storage unit 19 of the control device 4. The computer-readable recording medium may be, for example, a hard disc (HD), a flexible disc (FD), a compact disc (CD), a magnet optical disc (MO), or a memory card.

In the substrate processing system 1 configured as described above, the substrate transfer device 13 of the carry-in/out station 2 first takes out a wafer W from a carrier C placed in the carrier placing section 11, and then places the taken wafer W on the transfer unit 14. The wafer W placed on the transfer unit 14 is taken out from the transfer unit 14 by the substrate transfer device 17 of the processing station 3 and carried into a processing unit 16.

The wafer W carried into the processing unit 16 is processed by the processing unit 16, and then, carried out from the processing unit 16 and placed on the delivery unit 14 by the substrate transfer device 17. After the processing of placing the wafer W on the delivery unit 14, the wafer W returns to the carrier C of the carrier placing section 11 by the substrate transfer device 13.

<2. Schematic Configuration of Processing Unit>

Figure 2:
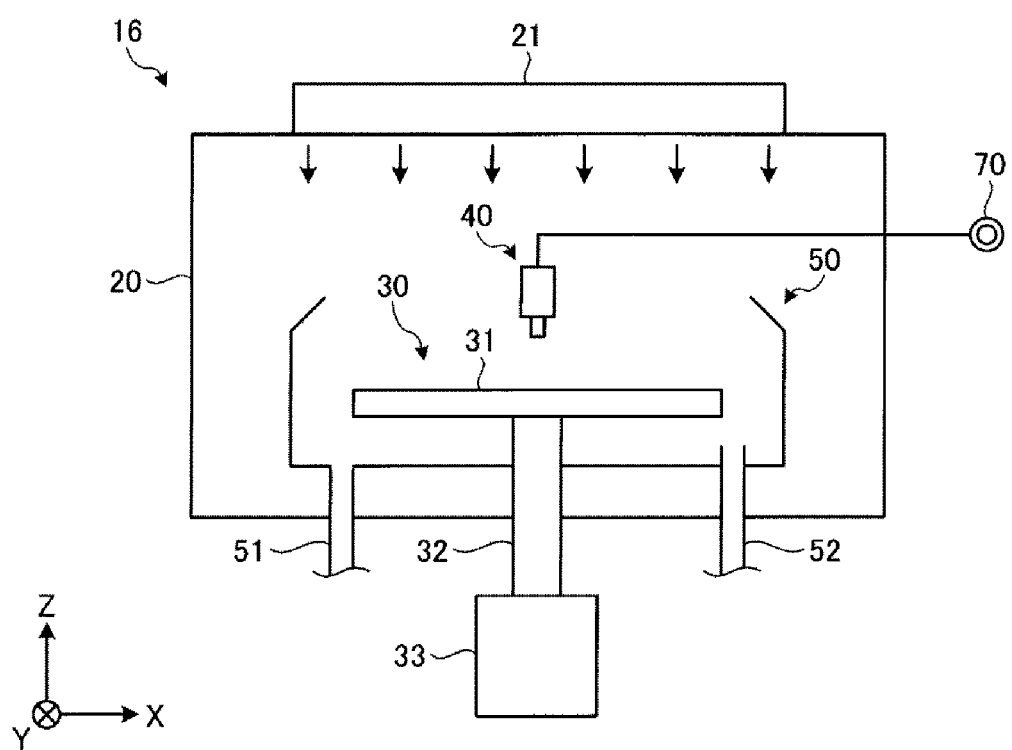
FIG. 2 is a view illustrating a schematic configuration of a processing unit.

Next, descriptions will be made on the configuration of the processing unit 16 with reference to FIG. 2. FIG. 2 is a view illustrating a schematic configuration of the processing unit 16.

As illustrated in FIG. 2, the processing unit 16 is provided with a chamber 20, a substrate holding mechanism 30, a processing fluid supply unit 40, and a recovery cup 50.

The chamber 20 accommodates the substrate holding mechanism 30, the processing fluid supply unit 40, and the recovery cup 50. A fan filter unit (FFU) 21 is provided on the ceiling of the chamber 20. The FFU 21 forms a downflow in the chamber 20.

The substrate holding mechanism 30 is provided with a holding unit 31, a support unit 32, and a driving unit 33. The holding unit 31 holds the wafer W horizontally. The support unit 32 is a vertically extending member, and has a base end portion supported rotatably by the driving unit 33 and a tip end portion supporting the holding unit 31 horizontally. The driving unit 33 rotates the support unit 32 around the vertical axis. The substrate holding mechanism 30 rotates the support unit 32 by using the driving unit 33, so that the holding unit 31 supported by the support unit 32 is rotated, and hence, the wafer W held in the holding unit 31 is rotated.

The processing fluid supply unit 40 supplies a processing fluid onto the wafer W. The processing fluid supply unit 40 is connected to a processing fluid source 70.

The recovery cup 50 is disposed to surround the holding unit 31, and collects the processing liquid scattered from the wafer W by the rotation of the holding unit 31. A drain port 51 is formed on the bottom of the recovery cup 50, and the processing liquid collected by the recovery cup 50 is discharged from the drain port 51 to the outside of the processing unit 16. Further, an exhaust port 52 is formed on the bottom of the recovery cup 50 to discharge a gas supplied from the FFU 21 to the outside.

<3. Outline of Inspection Processing>

Figure 3:
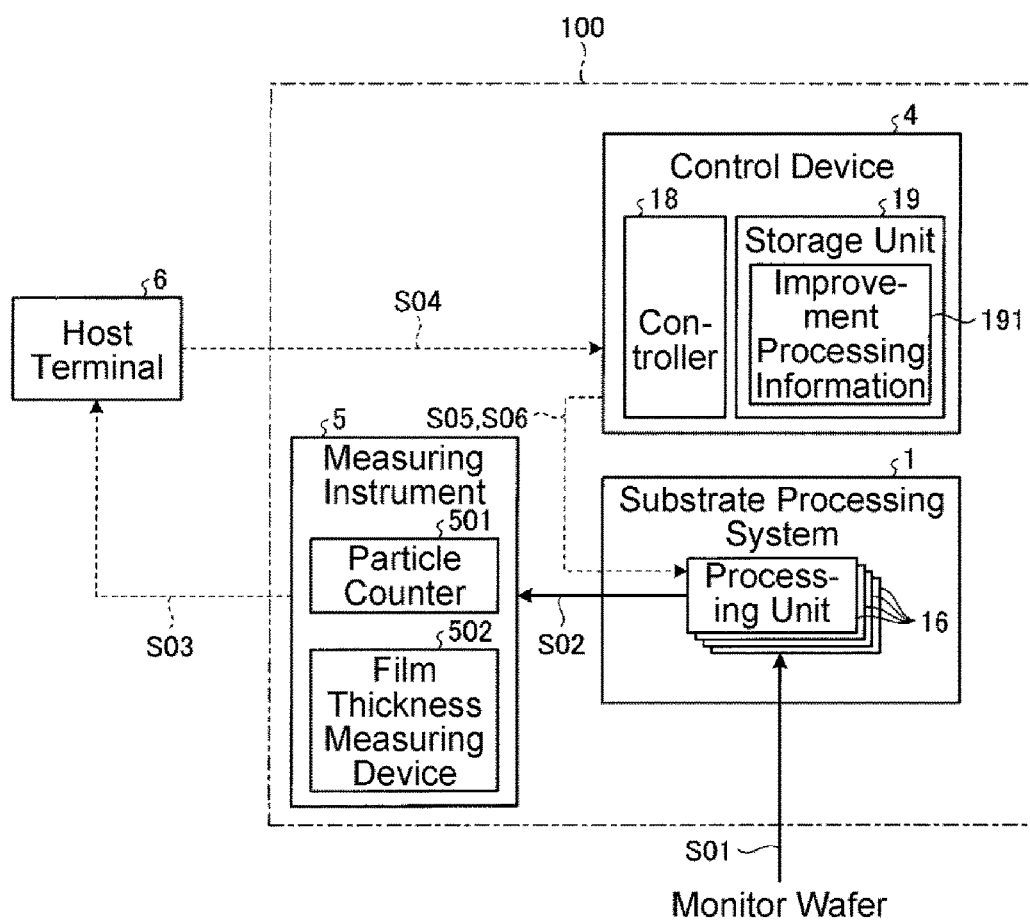
FIG. 3 is an explanatory view illustrating an outline of an inspection processing.

In the substrate processing system 1, an inspection processing for inspecting an operation situation of each processing unit 16 is periodically performed before the processing unit processes a product wafer. The outline of an inspection processing will be described with reference to FIG. 3. FIG. 3 is an explanatory view illustrating the outline of an inspection processing. In FIG. 3, a flow of a monitor wafer is indicated by solid line arrows and a flow of data is indicated by dotted line arrows.

While a case of performing an inspection processing using a monitor wafer is illustrated here as an example, the inspection processing may be performed using a product wafer rather than using a monitor wafer. In addition, while a case of periodically performing the inspection processing is illustrated here as an example, the inspection processing may be performed non-periodically rather than periodically, for example, after a maintenance of the processing units.

As illustrated in FIG. 3, within a factory 100 where the substrate processing system 1 is installed, a measuring instrument 5 is installed in addition to the substrate processing system 1 and the control device 4. The measuring instrument 5 is a device for measuring a state of a surface (processing target surface) of a wafer W. For example, the measuring instrument 5 may include, for example, a particle counter 501 that detects the number of particles attached to the surface of the wafer W and a film thickness measuring device 502 that measures a film thickness of a film formed on the wafer W. In addition, while FIG. 3 illustrates the particle counter 501 and the film thickness measuring device 502, a plurality of measuring instruments 5 may be installed within the factory 100 depending on items to be measured.

In addition, a host terminal 6 is installed outside the factory 100. The host terminal 6 is, for example, a personal computer (PC), and is connected to the measuring instrument 5 and the control device 4 via a local area network (LAN) or a network so-called internet.

In the inspection processing, first, a monitor wafer for inspection is carried into each processing unit 16 (S01), and a series of substrate processings are executed by each processing units 16. Subsequently, the processed monitor wafer is carried out from the substrate processing system 1 and then carried into the measuring instrument 5 (S02). The measuring instrument 5 performs surface measurements such as, for example, a particle measurement and a film thickness measurement, on the processed monitor wafer, and transmits the measurement results to the host terminal 6 through the network (S03).

Subsequently, upon acquiring the measurement results from the measuring instrument 5, the host terminal 6 determines whether the operation situation of each processing unit 16 is good or bad based on the acquired measurement results. In the present exemplary embodiment, the host terminal 6 is configured to determine whether an etching processing is good or bad based on the result of the film thickness measurement, and to determine whether the increased number of particles is good or bad.

The monitor wafer used for the inspection processing is, for example, an wafer having a film such as, for example, an oxide film previously formed thereon by a predetermined thickness and a predetermined number of particles attached thereto. The host terminal 6 determines whether an etching amount is within a prescribed range by comparing the measurement result of the film thickness of the monitor wafer after the series of substrate processings are performed, with the initial value of the film thickness. Then, when the etching amount exceeds the prescribed range, the host terminal 6 determines that there is an abnormality in the etching processing of the corresponding processing unit 16.

In addition, the host terminal 6 determines whether the increased number of particles is within a prescribed range by comparing the measurement result of the number of particles after the substrate processings are performed, with the initial value of the number of particles. Then, when the increased number of particles exceeds the prescribed range, the host terminal 6 determines that particles are generated in the corresponding processing unit 16. Here, the good or bad determination on the operation situation of each processing unit 16 is performed by the host terminal 6. However, the good or bad determination may be performed by the measuring instrument 5. Here, the good or bad determination is performed on both the etching processing and the increased number of particles. However, the good or bad determination may be performed on only one of the etching processing and the increased number of particles.

Subsequently, when an abnormality is detected in any one of the processing units 16 as a result of the good or bad determination, the host terminal 6 produces abnormality detection information including an identifier of the processing unit 16 with the detected abnormality (unit ID) and an identifier indicating the content of the detected abnormality (abnormality ID), and transmits the abnormality detection information to the control device 4 (S04).

In addition, upon acquiring the abnormality detection information, the control device 4 specifies the processing unit 16 with the detected abnormality by referring to the unit ID included in the acquired abnormality detection information, and shifts the specified processing unit 16 to a monitor mode (S05).

Here, the monitor mode refers to a mode that prevents the execution of a series of substrate processings for product wafers. When the processing unit 16 with the detected abnormality is shifted to the monitor mode in this way, a processing defect of the product wafers may be prevented in advance.

In the present exemplary embodiment, a processing unit 16 with an abnormality detected as a result of inspection processing is shifted to the monitor mode. Without being limited to this, however, the processing units 16 may be shifted to the monitor mode before initiating the inspection processing. In this case, the monitor mode may be maintained with respect to a processing unit 16 with an abnormality detected as a result of inspection processing and the monitor mode may be released with respect to a normal processing unit 16 in which no abnormality is detected.

Conventionally, a processing unit with a detected abnormality has been shifted to the monitor mode, then an operator arrives at the scene of operation to perform an improvement operation, then an inspection processing is performed again on the processing unit, and then, when no abnormality is detected, the monitor mode is released.

However, in this method, when it takes time until the operator arrives at the scene of operation, a delay occurs in the improvement operation, and the restoration of the processing unit is retarded by the delayed time in the improvement operation so that the operation rate of the substrate processing apparatus may be deteriorated. In particular, unmanned factories have been increased in recent years and thus, the time taken until an operator arrives at the scene of operation has been increased. For this reason, how to suppress deterioration in operation rate due to the absence of an operator has become one of problems to be solved.

Thus, in the substrate processing system 1 according to the present exemplary embodiment, the processing unit 16 with a detected abnormality is shifted to the monitor mode, and then, an improvement processing according to the content of abnormality is executed on the processing unit 16 based on the abnormality detection information acquired from the host terminal 6 (S06). In this way, since the improvement processing may be executed regardless of presence/absence of an operator, deterioration in operation rate of the substrate processing system 1 may be suppressed.

In addition, the improvement processing is executed according to improvement processing information 191 stored in the storage unit 19. Detailed contents of the improvement processing information 191 and the improvement processing will be described below.

<4. Detailed Configuration of Processing Unit and Content of Substrate Processing>

Figure 4:
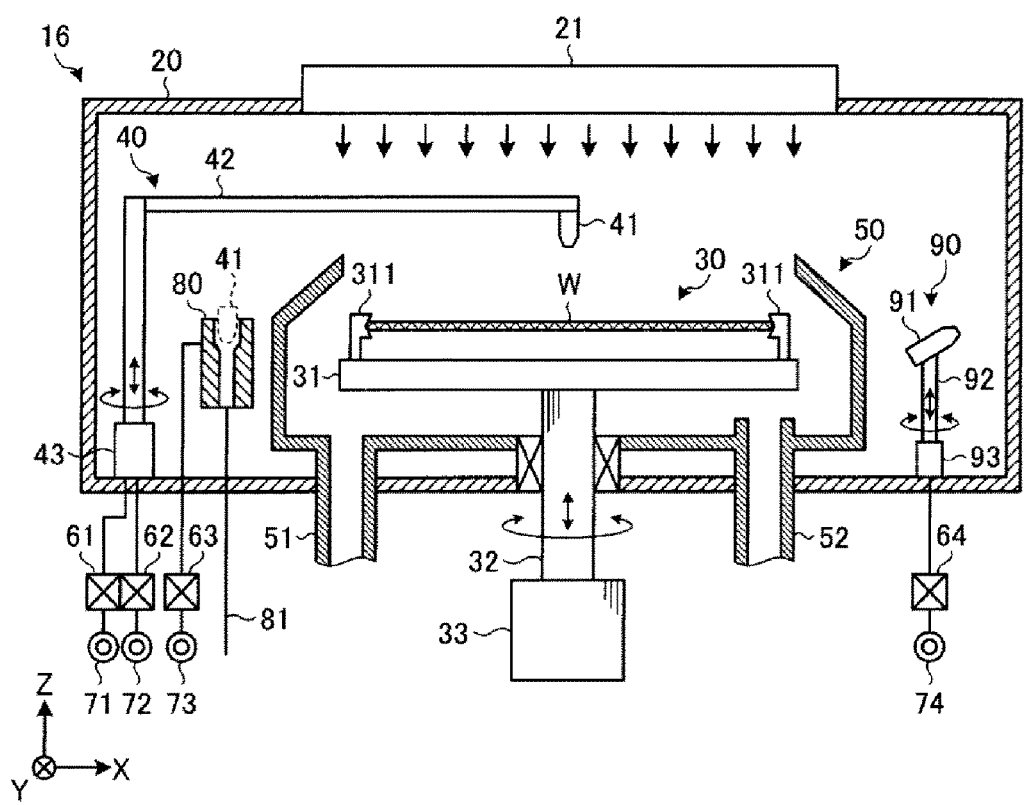
FIG. 4 is a view illustrating an exemplary detailed configuration of the processing unit.

Next, an exemplary detailed configuration of a processing unit 16 will be described with reference to FIG. 4. FIG. 4 is a view illustrating an exemplary detailed configuration of the processing unit 16.

As illustrated in FIG. 4, on the top surface of the holding unit 31 provided in the substrate holding mechanism 30, a chuck 311 is provided to hold a wafer W from a lateral side of the wafer W. The wafer W is maintained horizontally by the chuck 311 in a state where it is slightly spaced apart from the top surface of the holding unit 31.

The processing fluid supply unit 40 includes a nozzle 41, an arm 42 configured to horizontally support the nozzle 41, and a turning and lifting mechanism 43 configured to turn and lift the arm 42. The nozzle 41 is connected to a HF supply source 71 via a valve 61. In addition, the nozzle 41 is connected to a DIW supply source 72 via a valve 62. The processing fluid supply unit 40 supplies the HF supplied form the HF supply source 71 or the DIW supplied from the DIW supply source 72 to the wafer W held by the substrate holding mechanism 30, from the nozzle 41.

HF refers to hydrofluoric acid which is an example of an etching liquid used in a series of substrate processings. DIW refers to pure water of a normal temperature (about 23° C. to 25° C.) which is an example of a rinse liquid that is used in a series of substrate processings. In addition, DIW is also an example of a cleaning liquid used in chuck cleaning, nozzle cleaning, cup cleaning, and chamber cleaning to be described later.

In addition, the processing unit 16 may further include a nozzle bus 80 and a chamber cleaning unit 90 within the chamber 20. The nozzle bus 80 is an example of a nozzle cleaning unit and is used in a nozzle cleaning processing for cleaning the nozzle 41. More specifically, the nozzle bus 80 is connected with a DIW supply source 73 via a valve 63, and ejects the DIW supplied from the DIW supply source 73 toward the nozzle 41 so as to clean the nozzle 41. The cleaning water used for cleaning the nozzle 41 is discharged to the outside through a discharge path 81.

In addition, the nozzle bus 80 is also an example of a dummy dispensing unit. That is, the nozzle bus 80 also performs a dummy dispensing processing of the nozzle 41. The dummy dispensing processing refers to a processing of properly ejecting the processing liquid from the nozzle while the nozzle 41 is waiting without ejecting the processing liquid to the wafer W, in order to prevent, for example, deterioration of the processing liquid. The processing liquid ejected from the nozzle 41 is discharged to the outside through the discharge path 81.

Here, a case in which the nozzle bus 80 is an example of the nozzle cleaning unit and the dummy dispensing unit and performs both the nozzle cleaning processing and the dummy dispensing processing is illustrated as an example. However, each of the processing units 16 may include the nozzle cleaning unit and the dummy dispensing unit.

The chamber cleaning unit 90 is used in a chamber cleaning processing for cleaning the inner wall of the chamber 20. The chamber cleaning unit 90 includes a nozzle 91, an arm 92 that supports the nozzle 91 horizontally, and a turning and lifting mechanism 93 that turns and lifts the arm 92. The nozzle 91 is connected to a DIW supply source 74 via a valve 64. The chamber cleaning unit 90 ejects the DIW supplied from the DIW supply source 74 from the nozzle 91 toward the inner wall of the chamber 20 so as to clean the chamber 20.

Figure 5:
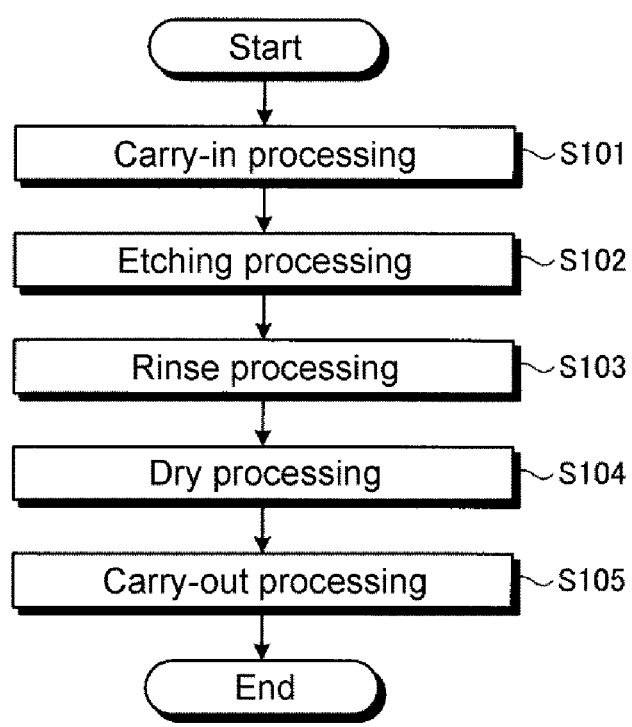
FIG. 5 is a flowchart illustrating processing procedures of a series of substrate processings executed by the processing unit.

Subsequently, a series of exemplary substrate processings executed by the processing unit 16 will be described with reference to FIG. 5. FIG. 5 is a flowchart illustrating processing procedures of a series of substrate processings executed by each processing unit 16.

In addition, the series of substrate processings executed by each processing unit 16 are controlled by the controller 18 provided in the control device 4. The controller 18 may be, for example, a central processing unit (CPU), and cause the processing unit 16 to execute the series of substrate processings by reading and executing a program (not illustrated) stored in the storage unit 19. In addition, the controller 18 may be configured only by hardware without using a program.

As illustrated in FIG. 5, first, a carry-in processing of a wafer W is performed in each processing unit 16 (step S101). In such a carry-in processing, the substrate transfer device 17 (see, e.g., FIG. 1) mounts the wafer W on support pins (not illustrated) of the holding unit 31, and then the chuck 311 holds the wafer W.

Subsequently, in the processing unit 16, an etching processing is performed (step S102). In the etching processing, first, the driving unit 33 rotates the holding unit 31 so as to rotate the wafer W held by the holding unit 31 at a preset number of revolutions. Subsequently, the nozzle 41 of the processing fluid supply unit 40 is positioned above the center of the wafer W. Thereafter, the valve 61 is opened for a predetermined length of time so that the HF supplied from the HF supply source 71 is supplied to the surface (processing target surface) of the wafer W from the nozzle 41. The HF supplied to the wafer W is spread over the entire surface of the wafer W by the centrifugal force generated as the wafer W is rotated. Thus, a film formed on the surface of the wafer W is etched by the HF.

Subsequently, in the processing unit 16, a rinse processing for rinsing the surface of the wafer W with DIW is performed (step S103). In such a rinse processing, the valve 62 is opened for a predetermined length of time so that the DIW supplied from the DIW supply source 72 is supplied to the surface of the wafer W from the nozzle 41 and thus, the HF remaining on the wafer W is washed out. Subsequently, in the processing unit 16, a dry processing is performed (step S104). In such a dry processing, the rotational speed of the wafer W is accelerated to shake off the DIW on the wafer W so as to dry the wafer W.

The processings of steps S103 and S104 are an example of a substrate cleaning processing. Here, the dry processing is performed after the rinse processing, but the dry processing may be performed after a substitution processing is performed to substitute the DIW on the wafer W with isopropyl alcohol (IPA) after the rinse processing.

Subsequently, in the processing unit 16, a carry-out processing is performed (step S105). In the carry-out processing, the rotation of the wafer W by the driving unit 33 is stopped, and then the wafer W is carried out from the processing unit 16 by the substrate transfer device 17 (see, e.g., FIG. 1). When the carry-out processing is completed, a series of substrate processing for one wafer W are completed.

In addition, in the inspection processing, the series of substrate processings illustrated in FIG. 5 are executed on a monitor wafer.

<5. Content of Improvement Processing Information>

Next, exemplary improvement processing information 191 stored in the storage unit 19 will be described with reference to FIG. 6. FIG. 6 is a view illustrating exemplary improvement processing information 191.

The improvement processing information 191 is information in which contents of abnormalities detected by the detection processing and contents of improvement processings to be executed are correlated with each other. More specifically, as illustrated in FIG. 6, the improvement processing information 191 includes an "Abnormality Content" item and an "Improvement Processing" item stored therein.

The "Abnormality Content" item includes a "Kind" item and a "Level" item. The "Kind" item is an item in which information indicating a kind of abnormality such as, for example, "Particle Generation" or "Etching Defect," is stored. In addition, the "Level" item is an item in which information indicating a degree of abnormality for each kind such as, for example, "Lv1" or "Lv2," is stored. For example, "Lv1" in "Particle Generation" is information indicating that the increased number of particles on the monitor wafer after the series of substrate processings is "1 to 50," and "Lv2" in "Particle Generation" is information indicating that the increased number of particles on the monitor wafer after the series of substrate processings is "51 to 100." Similarly, "Etching Defect" is subdivided into, for example, "Lv1" and "Lv2" in sequence from a level in which a deviation from a prescribed range is small.

Meanwhile, the "Improvement Processing" item is an item in which information indicating contents of improvement processings to be executed in the processing unit 16 is stored. For example, in the "Improvement Processing" item, "Chuck Cleaning" is stored to be correlated with "Lv1" in "Particle Generation," and "Dummy Dispense (Lv1)" is stored to be correlated with "Lv1" in "Etching Defect."

In addition, the "Abnormality Content" item corresponds to the abnormality IDs included in the abnormality detection information. In fact, IDs equal to the abnormality IDs are stored in the "Abnormality Content" item. Also in the "Improvement Processing" item, in fact, improvement processing IDs indicating the contents of improvement processings are stored.

<6. Detailed Operation of Controller in Inspection Processing>

Figure 7:
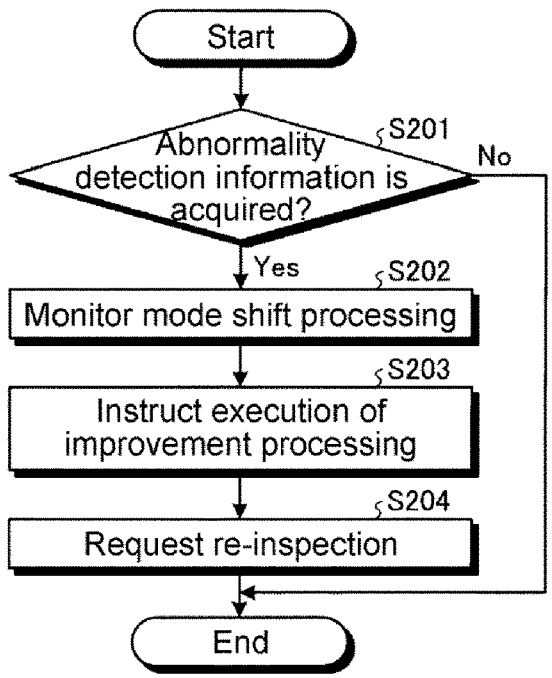
FIG. 7 is a flowchart illustrating exemplary processing procedures executed by a controller in the inspection processing.

Next, descriptions will be made on detailed operations of the controller 18 in an inspection processing with reference to FIG. 7. FIG. 7 is a flowchart illustrating exemplary processing procedures executed by the controller 18 in an inspection processing.

As illustrated in FIG. 7, the controller 18 determines whether abnormality detection information is acquired from the host terminal 6 (step S201). In this processing, when it is determined that the abnormality detection information is acquired (step S201, Yes), the controller 18 shifts a processing unit 16 corresponding to the unit ID included in the acquired abnormality detection information to the monitor mode (step S202). In addition, after performing the processing of step S202, the controller 18 may output a notice to the effect that the processing unit 16 has been shifted to the monitor mode, to the host terminal 6.

In this way, depending on whether the abnormality detection information is acquired from the host terminal 6, the controller 18 determines whether the corresponding processing unit 16 can be used. In addition, upon acquiring the abnormality detection information, the controller 18 determines that the corresponding processing unit 16 cannot be used and shifts the corresponding unit 16 to the monitor mode. In addition, without being limited to this, the controller 18 may determine whether the processing unit 16 can be used according to the contents of the acquired abnormality detection information.

Subsequently, the controller 18 instructs the processing unit 16 with the detected abnormality to execute an improvement processing corresponding to the content of the detected abnormality (step S203). More specifically, the controller 18 specifies an improvement processing ID corresponding to the abnormality ID included in the abnormality detection information with reference to the improvement processing information 191, and causes the processing unit 16 to execute the improvement processing corresponding to the specified improvement processing ID.

For example, when the abnormality ID indicates "Lv1" in "Particle Generation," the controller 18 specifies the improvement processing ID of "Chuck Cleaning" from the improvement processing information 191 as the corresponding improvement processing. In addition, the controller 18 causes the corresponding processing unit 16 to execute "Chuck Cleaning" corresponding to the specified improvement processing ID. "Chuck Cleaning" refers to a processing of removing dirt attached to the chuck 311 (see, e.g., FIG. 4) provided in the substrate holding mechanism 30 by ejecting the DIW supplied from the DIW supply source 72 to the chuck 311 from the nozzle 41.

In addition, when the abnormality ID indicates "Lv2" in "Particle Generation", the controller 18 causes the corresponding processing unit 16 to execute "Chuck Cleaning+Nozzle Cleaning" as the corresponding improvement processing. "Chuck Cleaning+Nozzle Cleaning" refers to a processing of executing "Nozzle Cleaning" in addition to "Chuck Cleaning" described above. "Nozzle Cleaning" refers to a processing of removing dirt attached to the nozzle 41 by cleaning the nozzle 41 using the nozzle bus 80.

In addition, when the abnormality ID indicates "Lv3" in "Particle Generation," the controller 18 causes the corresponding processing unit 16 to execute "Chuck Cleaning+Nozzle Cleaning+Cup Cleaning" as the corresponding improvement processing. "Chuck Cleaning+Nozzle Cleaning+Cup Cleaning" refers to a processing of executing "Cup Cleaning" in addition to "Cup Cleaning" and "Nozzle Cleaning" described above. "Cup Cleaning" refers to a processing of removing dirt attached to the recovery cup 50 by ejecting the DIW supplied from the DIW supply source 72 to the recovery cup 50 from the nozzle 41.

In addition, when the abnormality ID indicates "Lv4" in "Particle Generation," the controller 18 causes the corresponding processing unit 16 to execute "Chuck Cleaning+Nozzle Cleaning+Cup Cleaning+Chamber Cleaning" as the corresponding improvement processing. "Chuck Cleaning+Nozzle Cleaning+Cup Cleaning+Chamber Cleaning" refers to a processing of executing "Chamber Cleaning" in addition to "Chuck Cleaning," "Nozzle Cleaning," and "Cup Cleaning" described above. "Chamber Cleaning" refers to a processing of removing dirt attached to the inner wall of the chamber 20 by ejecting DIW toward the inner wall of the chamber 20 from the nozzle 91 of the chamber cleaning unit 90.

In addition, when the abnormality ID indicates "Lv1" in "Etching Defect," the controller 18 causes the corresponding processing unit 16 to execute "Dummy Dispense (Lv1)" as the corresponding improvement processing. In addition, when the abnormality ID indicates "Lv2" in "Etching Defect," the controller 18 causes the corresponding processing unit 16 to execute "Dummy Dispense (Lv2)" as the corresponding improvement processing. "Dummy Dispense (Lv1)" refers to a processing of executing a dummy dispensing processing for a time T1, and "Dummy Dispense (Lv2)" refers to a processing of executing the above-mentioned dummy dispensing processing for a time T2 that is longer than the time T1. In other words, "Dummy Dispense (Lv2)" refers to a processing of ejecting a processing liquid more than that in "Dummy Dispense (Lv1)" from the nozzle 41.

As described above, the substrate processing system 1 is configured to differentiate improvement processings depending on the kinds of abnormalities, and even in the same kind of abnormality, to differentiate the contents of the corresponding improvement processing for respective levels. More specifically, as the abnormality level increases, the substrate processing system 1 is configured to increase the kinds of processings to be executed as improvement processings, and even in a single processing, to increase the processing time. Thereby, an optimal improvement processing according to an abnormality level may be executed in the processing unit 16.

In addition, the improvement processing information 191 illustrated in FIG. 6 is merely an example, and the contents of improvement processings or combinations of respective processings are not limited to those illustrated in the drawing.

Subsequently, when the above-mentioned improvement processings are terminated, the controller 18 outputs a re-inspection request to the host terminal 6 (step S204). The re-inspection request includes the unit ID of a processing unit 16 that has executed the improvement processings, and refers to a notification requesting the re-execution of an inspection processing for the processing unit 16. By outputting the re-inspection request to the host terminal 6, the time until the inspection processing is performed again may be shortened as much as possible. After the processing of step S204 is terminated or when the abnormality detection information is not acquired in step S201 (step S201, No), the controller 18 terminates a series processing procedures in the inspection processings.

In addition, when an abnormality is detected in the processing unit 16 again as a result of re-inspection by the measuring instrument 5 thereafter, the controller 18 may perform an improvement processing on the processing unit 16 again based on the result of re-inspection. In such a case, when the number of retries of the improvement processing exceeds a pre-set threshold (e.g., three times), the controller 18 may perform a notification processing to the operator instead of the improvement processing. The notification processing is, for example, a processing of notifying the operator of the abnormality detection information including an unit ID of a processing unit with a detected abnormality and an abnormality ID indicating the content of the abnormality via e-mail, or a processing of displaying the content of the abnormality detection information on a display provided on the substrate processing system 1.

Here, it is described that when an abnormality is detected in a processing unit 16, an improvement processing is necessarily performed on the processing unit 16 with the detected abnormality. However, when the level of the detected abnormality is equal to or higher than a pre-set level, the controller 18 may perform the notification processing to the operator without causing the processing unit 16 to execute the improvement processing.

Figure 8:
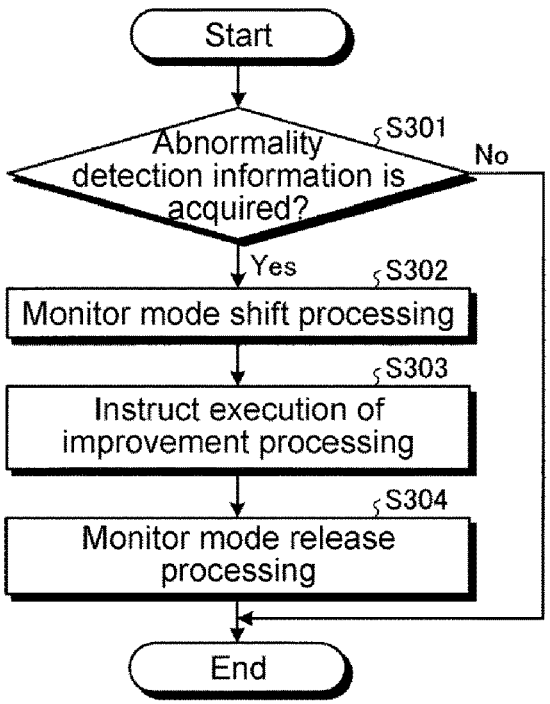
FIG. 8 is a flowchart illustrating other exemplary processing procedures executed by the controller in the inspection processing.

FIG. 8 is a flowchart illustrating another exemplary processing procedures executed by the controller 18 in an inspection processing. Steps S301 to S303 illustrated in FIG. 8 are equal to steps S201 to S203 illustrated in FIG. 7 and thus, the descriptions thereof will be omitted.

As illustrated in FIG. 8, after instructing the execution of an improvement processing (step S303), the controller 18 may perform a processing of releasing the monitor mode of the processing unit 16 that has executed the improvement processing (step S304). Then, the processing unit 16 is brought into a state where the processing unit 16 is capable of processing a product wafer, deterioration in operation rate of the substrate processing system 1 may further suppressed.

The controller 18 may be configured to be capable of changing a mode of executing the processing procedures (steps S201 to S204) illustrated in FIG. 7 and a mode of executing the processing procedures (steps S301 to S304) illustrated in FIG. 8 by setting.

As described above, the substrate processing system 1 according to the first exemplary embodiment (corresponding to an example of a "substrate processing apparatus") includes a processing unit 16 and a controller 18. The processing unit 16 processes a wafer W. The controller 18 causes the processing unit 16 to execute a series of substrate processings. In addition, the controller 18 determines whether the processing unit 16 can be used based on the content of an abnormality detected by a surface measurement performed on a monitor wafer on which a series of substrate processings have been performed by the processing unit 16, and when it is determined that the processing unit 16 cannot be used, the controller 18 causes the processing unit 16 with the detected abnormality to execute an improvement processing corresponding to the content of the detected abnormality.

Thus, according to the substrate processing system 1 according to the first exemplary embodiment, the operation rate of the processing unit 16 may be suppressed from being deteriorated in the case where an abnormality is detected.

In addition, the host terminal 6 may be provided with functions as follows: a function of determining whether a processing unit 16 can be used based on the content of an abnormality detected by a surface measurement performed on a monitor wafer on which a series of substrate processings have been performed; a function of specifying an improvement processing by making the acquired content of the abnormality correspond to the improvement information stored in the storage unit when it is determined that the processing unit 16 cannot be used; and a function of sending a request for causing the processing unit 16 with the detected abnormality to execute the improvement processing corresponding to the detected abnormality, to the controller 18 of the substrate processing apparatus. Further, based on a request from the host terminal 6, the controller 18 of the substrate processing apparatus may cause the processing unit 16 with the detected abnormality to execute the improvement processing corresponding to the content of the detected abnormality.

Second Exemplary Embodiment

In the first exemplary embodiment, descriptions have been made on a case in which the measuring instrument 5 is provided outside the substrate processing system 1. However, the measuring instrument 5 may be integrally incorporated in the substrate processing system 1. In the second exemplary embodiment, descriptions will be made on the contents of inspection processings in the case where the measuring instrument 5 is incorporated in the substrate processing system 1.

Figure 9:
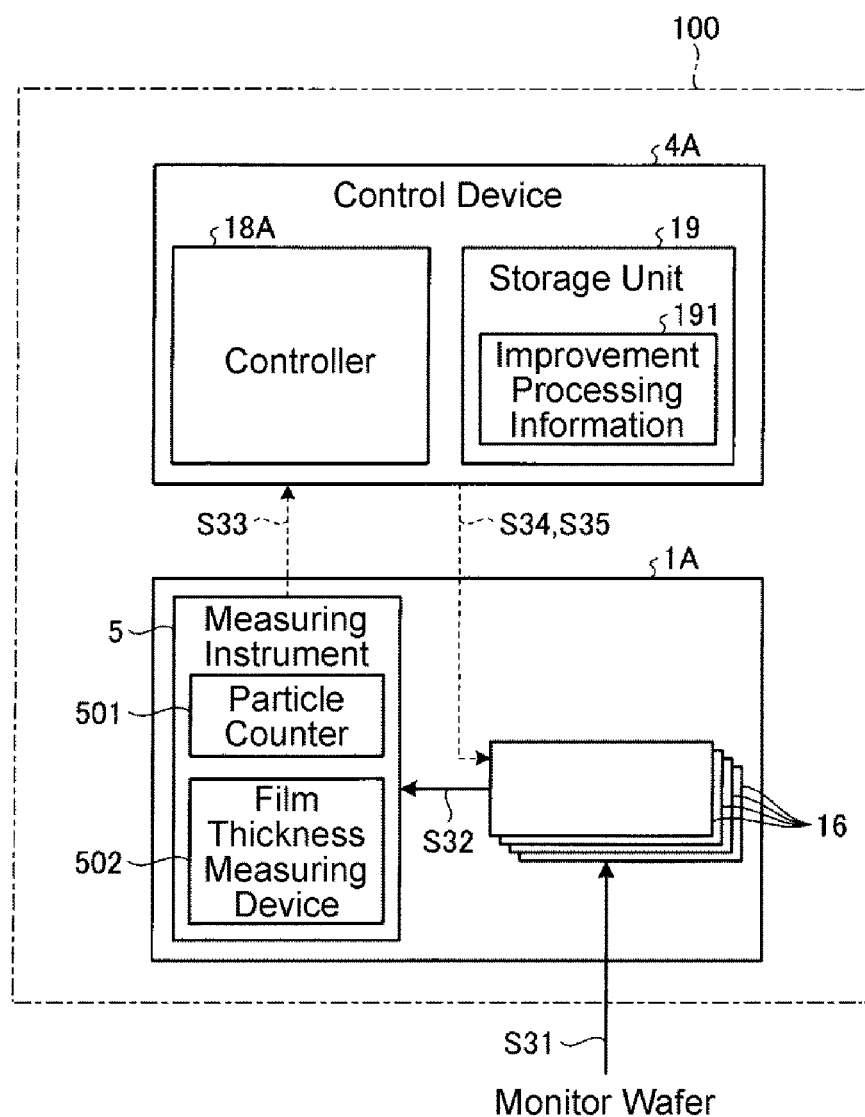
FIG. 9 is an explanatory view illustrating an outline of an inspection processing according to a second exemplary embodiment.

FIG. 9 is an explanatory view of an outline of an inspection processing of the second exemplary embodiment. In the following description, the components that are the same as those described above will be denoted by the same symbols as the components described above, and repeated descriptions will be omitted.

As illustrated in FIG. 9, the substrate processing system 1A includes a measuring instrument 5 therein. The measuring instrument 5 is arranged in a processing station (see, e.g., FIG. 1) of the substrate processing system 1A, for example. In addition, the control device 4A according to the second exemplary embodiment is connected to the measuring instrument 5 via a local area network (LAN) or a network so-called internet.

In the inspection processing according to the second exemplary embodiment, first, a monitor wafer for inspection is carried into each processing unit 16, and a series of substrate processings are executed in the processing unit 16 (S31). Subsequently, after the series of substrate processings, the monitor wafer is carried out from the processing unit 16, and carried into the measuring instrument 5 (S32). The measuring instrument 5 performs a surface measurement such as, for example, a particle measurement or a film thickness measurement on the monitor wafer after the series of substrate processings, and transmits the measurement result to the control device 4A (S33).

Subsequently, upon acquiring the measurement result from the measuring instrument 5, the controller 18A of the control device 4A determines whether an operation situation of each processing unit 16 is good or bad based on the acquired measurement result. In addition, the good or bad determination may be performed by the measuring instrument 5.

Subsequently, when an abnormality is detected in any one of the processing units 16 as a result of determination, the controller 18A produces abnormality detection information including the unit ID of the processing unit 16 with a detected abnormality, and an abnormality ID indicating the detected abnormality. Then, based on the produced abnormality detection information, the controller 18A shifts the corresponding processing unit 16 to the monitor mode (S34), and causes the processing unit 16 to execute an improvement processing described in the first exemplary embodiment (S35).

Figure 10:
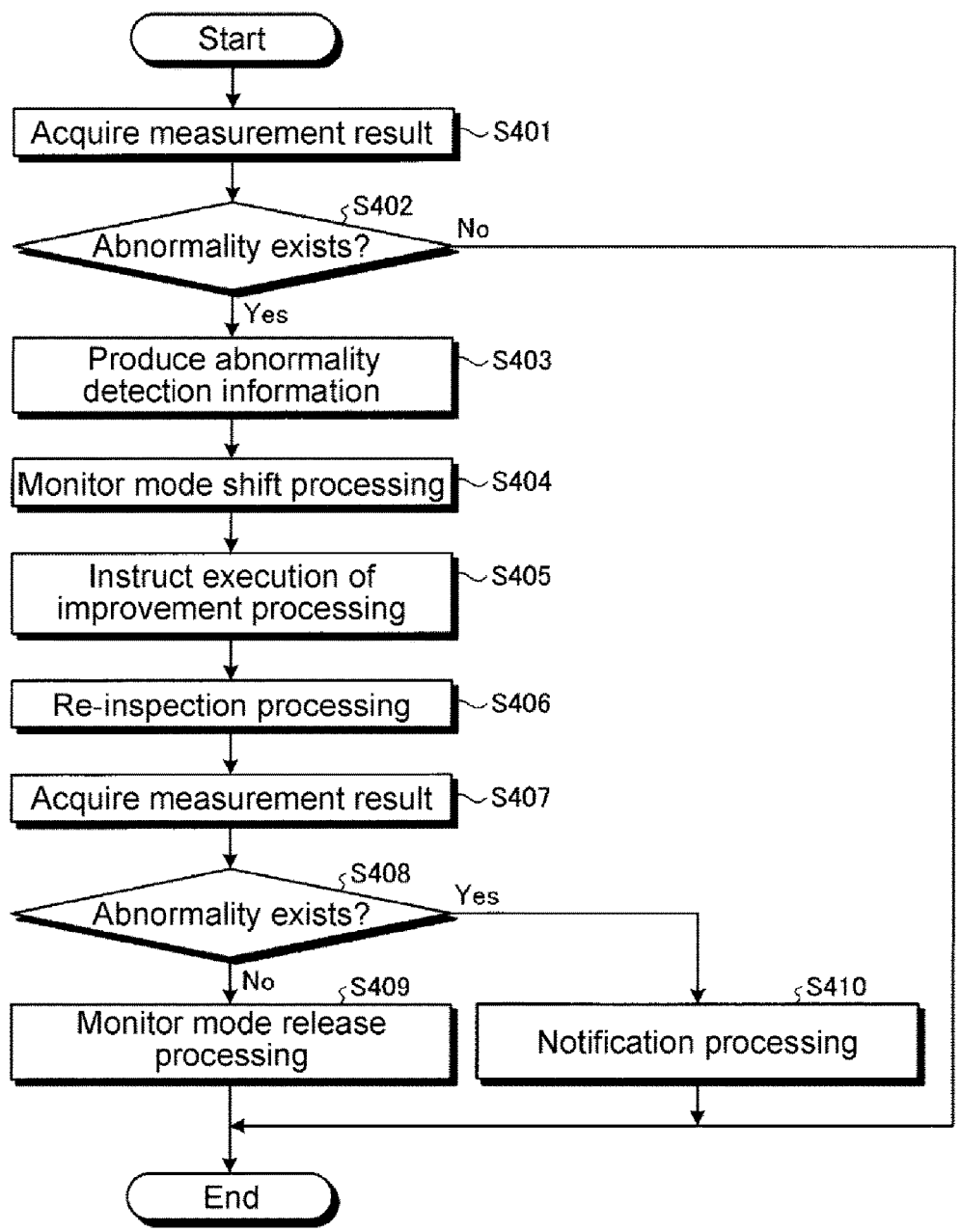
FIG. 10 is a flowchart illustrating exemplary processing procedures executed by the controller in the inspection processing according to the second exemplary embodiment.

Next, descriptions will be made on detailed operations of the controller 18A in the inspection processing according to the second exemplary embodiment with reference to FIG. 10. FIG. 10 is a flowchart illustrating exemplary processing procedures executed by the controller 18A in the inspection processing according to the second exemplary embodiment.

As illustrated in FIG. 10, upon acquiring a measurement result from the measuring instrument 5 (step S401), the controller 18A determines whether an abnormality is detected in any one of the processing units 16 (step S402). When an abnormality is detected in any one of the processing units 16 (step S402, Yes), the controller 18A determines that processing units 16 with a detected abnormality cannot be used, and produces abnormality detection information including the unit ID of the processing unit 16 with a detected abnormality and an abnormality ID indicating the content of abnormality (step S403).

Subsequently, the controller 18A shifts the processing unit 16 corresponding to the unit ID included in the abnormality detection information to the monitor mode (step S404), and then instruct the corresponding processing unit 16 to execute an improvement processing (step S405). In addition, the processings in steps S404 and S405 are the same as the processings in steps S202 and S203 illustrated in FIG. 7.

Subsequently, after the improvement processing is complemented, the controller 18A executes again the inspection processing on the processing unit 16 that has executed the improvement processing (step S406). More specifically, the controller 18A carries a monitor wafer into the processing unit 16 that has executed the improvement processing and causes the processing unit 16 to execute a series of substrate processings. Subsequently, the controller 18A carries the monitor wafer out of the processing unit 16, carries the monitor wafer into the measuring instrument 5, and causes the measuring instrument 5 to execute a surface measurement on the monitor wafer.

Subsequently, the controller 18A acquires a measurement result from the measuring instrument 5 (step S407), and determines whether an abnormality is detected in any one of the processing units 16 that has performed the re-inspection processing (step S408). Then, the controller 18A performs a processing of releasing the monitor mode on a processing unit 16 in which no abnormality is detected (step S409), and when a processing unit 16 with a detected abnormality exists (step S408, Yes), the controller 18A performs a notification processing (step S410). As the notification processing, the controller 18A performs, for example, a processing of notifying the operator of abnormality detection information including the unit ID of the processing unit 16 with the detected abnormality and an abnormality ID indicating the content of the abnormality via e-mail, or a processing of displaying the content of abnormality on the display provided on the substrate processing system 1A.

When the processing of step S409 or step S410 is completed, or when no abnormality is detected in all the processing units 16 in step S402 (step S402, No), the controller 18A terminates a series of processing procedures in the inspection processing according to the second exemplary embodiment.

As described above, the substrate processing system 1A according to the second exemplary embodiment includes the measuring instrument 5 incorporated therein so as to execute, for example, the production of abnormality detection information, the re-inspection processing, or the monitor mode release processing is executed regardless of the host terminal 6. For this reason, according to the substrate processing system 1A of the second exemplary embodiment, deterioration in operation rate in the case where an abnormality is detected in a processing unit 16 may be further suppressed.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:
1. A substrate processing apparatus comprising:
   a plurality of processing units, each of which has an associated unit ID, wherein each processing unit comprises a substrate holder configured to hold and rotate the substrate, a dummy dispenser, and a nozzle configured to eject an etching liquid either onto the substrate or into the dummy dispenser; and
   a controller configured to cause each of the processing units to execute a substrate etching processing, wherein after the substrate etching processing, a particle parameter and an etching parameter are measured and compared with a respective predetermined normal range and a predetermined abnormal range by the controller, and when the particle parameter and the etching parameter fall into the respective predetermined abnormal range, the controller associates the unit ID for a corresponding processing unit with a detected abnormality and an abnormality ID associated with the respective predetermined abnormal range;

wherein the controller is configured to associate an improvement processing ID to each abnormality ID it receives, and the improvement processing ID corresponds to instructions that when executed by the controller, causes the processing unit with the detected abnormality to execute an improvement processing; and wherein when the abnormality ID represents an etching defect, the associated improvement processing ID corresponds to instructions that when executed by the controller causes the processing unit with the detected abnormality to execute, as the improvement processing, a dummy dispensing processing of ejecting the etching liquid into the dummy dispenser from the nozzle and the controller is configured to increase a processing time of the dummy dispensing processing as a level of the etching defect increases.

2. The substrate processing apparatus of claim 1, further comprising:
a memory configured to store improvement processing information that for each of the plurality of abnormal ranges, comprises the correlation between the abnormality ID and the improvement processing ID,
wherein the controller is configured to:
determine, based on the abnormality ID, whether the processing unit with the detected abnormality can be used or not; and
upon determining that the processing unit cannot be used, execute the instructions corresponding to the improvement processing ID.

3. The substrate processing apparatus of claim 1, wherein the controller is configured to repeat the performance of the improvement processing corresponding to the improvement processing ID with respect to the processing unit with the detected abnormality.

4. The substrate processing apparatus of claim 1, wherein the controller is configured to:
shift the processing unit with the detected abnormality to a monitor mode to prevent the processing unit with a detected abnormality from executing the substrate processing on a product substrate;
then cause the processing unit with the detected abnormality to execute the improvement processing ID; and
then, release the monitor mode of the processing unit.

5. The substrate processing apparatus of claim 1, wherein the controller is configured to:
shift the processing unit with the detected abnormality to a monitor mode to prevent the processing unit with the detected abnormality from executing the substrate processing on a product substrate;
then cause the processing unit with the detected abnormality to execute the improvement processing;
then cause the processing unit the processing unit with the detected abnormality to repeat the execution of the improvement processing; and then, upon determining that the processing unit with the detected abnormality can be used, release the monitor mode of the processing unit with the detected abnormality.

6. The substrate processing apparatus of claim 1, further comprising:
a measuring instrument configured to measure the etching parameter.

7. The substrate processing apparatus of claim 6, wherein the controller is configured to:
instruct the measuring instrument to measure the etching parameter; and
determine whether the etching parameter is within the predetermined normal range or is within one of the plurality of predetermined abnormal ranges.

8. The substrate processing apparatus of claim 1,
wherein when the abnormality ID represents an abnormal generation of particles, the associated improvement processing ID corresponds to instructions that when executed by the controller causes the processing unit with the detected abnormality to execute, as the improvement processing, a cleaning of the substrate holder by ejecting a cleaning liquid toward the substrate holder from the nozzle.

9. The substrate processing apparatus of claim 1, wherein each of the processing units further comprises a nozzle cleaning unit configured to clean the nozzle, and
wherein when the abnormality ID represents an abnormal generation of particles, the associated improvement processing ID corresponds to instructions that when executed by the controller causes the processing unit with the detected abnormality to execute, as the improvement processing, a cleaning of the nozzle using the nozzle cleaning unit.

10. The substrate processing apparatus of claim 1, wherein each of the processing units further comprises a recovery cup configured to enclose a periphery of the substrate held on the substrate holder to recover the processing liquid scattered from the substrate, and
wherein when the abnormality ID represents an abnormal generation of particles, the associated improvement processing ID corresponds to instructions that when executed by the controller causes the processing unit with the detected abnormality to execute, as the improvement processing, a cleaning of the recovery cup by ejecting a cleaning liquid toward the recovery cup from the nozzle.

11. The substrate processing apparatus of claim 1, wherein each of the processing units further comprises a chamber configured to accommodate the substrate holder and the nozzle, and
wherein when the abnormality ID represents an abnormal generation of particles, the associated improvement processing ID corresponds to instructions that when executed by the controller causes the processing unit with the detected abnormality to execute, as the improvement processing, cleaning of an inner wall of the chamber by ejecting a cleaning liquid toward the inner wall of the chamber from the nozzle.

12. The substrate processing apparatus of claim 1, wherein the etching parameter is a film thickness.

13. The substrate processing apparatus of claim 1, wherein the particle parameter is a particle number measurement.

14. A substrate processing method for a plurality of processing units, each of which has an associated unit ID, wherein each processing unit comprises a substrate holder configured to hold and rotate the substrate, a dummy dispenser, and a nozzle configured to eject an etching liquid either onto the substrate or into the dummy dispenser, the method comprising:

performing a substrate etching processing in a plurality of the processing units;

measuring an etching parameter and a particle parameter;

comparing the etching parameter and the particle parameter with a respective predetermined normal range and a predetermined abnormal range, and when the etching parameter and particle parameter fall into the respective predetermined abnormal range, associating the unit ID for a corresponding processing unit with a detected abnormality and an abnormality ID associated with the respective predetermined abnormal range;

associating an improvement processing ID to the abnormality ID; and performing an improvement processing corresponding to the improvement processing ID with respect to the processing unit with the detected abnormality, wherein when the abnormality ID represents an etching defect, the associated improvement processing ID corresponds to instructions that when executed by the controller causes the processing unit with the detected abnormality to execute, as the improvement processing, a dummy dispensing processing of ejecting the etching liquid into the dummy dispenser from the nozzle and the controller is configured to increase a processing time of the dummy dispensing processing as a level of the etching defect increases.

15. The substrate processing method of claim 14, wherein the improvement processing is a selected one of (i) a chuck cleaning, (ii) a nozzle cleaning, (iii) a cup cleaning, and (iv) a chamber cleaning, when the abnormality ID is an abnormal generation of particles.

16. A substrate processing apparatus comprising:
a plurality of processing units, each of which has an associated unit ID, wherein each processing unit comprises a substrate holder configured to hold and rotate the substrate, a dummy dispenser, and a nozzle configured to eject an etching liquid either onto the substrate or into the dummy dispenser; and a controller configured to cause each of the processing units to execute a substrate etching processing, wherein during the substrate etching processing, an etching parameter will be measured and compared with a predetermined normal range and a predetermined abnormal range, and when the etching parameter falls into the predetermined abnormal range, the controller associates the unit ID for a corresponding processing unit with a detected abnormality and an abnormality ID associated with the respective predetermined abnormal range;

wherein the controller is configured to associate an improvement processing ID to each abnormality ID it receives, and the improvement processing ID corresponds to instructions that when executed by the controller, causes the processing unit with the detected abnormality to execute an improvement processing, wherein when the abnormality ID represents an etching defect, the associated improvement processing ID corresponds to instructions that when executed by the controller causes the processing unit with the detected abnormality to execute, as the improvement processing, a dummy dispensing processing of ejecting the etching liquid into the dummy dispenser from the nozzle, and the controller is configured to increase a processing time of the dummy dispensing processing as a level of the etching defect increases.

* * * * *